No. 880,156. PATENTED FEB. 25, 1908.
R. C. McCAFFREY.
TRAP FOR BASINS, SINKS, &c.
APPLICATION FILED JAN. 25, 1907.

WITNESSES:
J. C. Martin
F. H. Feller

RICHARD C. McCAFFREY
INVENTOR

BY G. J. Bowman
ATTORNEY

UNITED STATES PATENT OFFICE.

RICHARD C. McCAFFREY, OF SPOKANE, WASHINGTON.

TRAP FOR BASINS, SINKS, &c.

No. 880,156.    Specification of Letters Patent.    Patented Feb. 25, 1908.

Application filed January 25, 1907. Serial No. 354,141.

*To all whom it may concern:*

Be it known that I, RICHARD C. McCAFFREY, a citizen of the United States, residing at Spokane, in the county of Spokane and State of Washington, have invented a new and useful Improvement in Traps for Basins, Sinks, &c., of which the following is a specification.

My invention relates to improvements in traps for basins, sinks, etc., in which a ventilating pipe joins the waste pipe at an angle towards its outlet; and the objects of my improvement are to provide, first, a ventilating pipe that will not be obstructed by the liquid and solid matter passing from the trap into the waste pipe entering and being deposited therein, closing the vent and producing a siphoning of the contents of the trap; and second, an interchangeable trap fitting adapted to form with equal facility and advantage a P- or an S-trap.

My invention consists in the peculiar construction and combination of parts, of which the following is a full, clear and exact description.

Figures 1, 2:
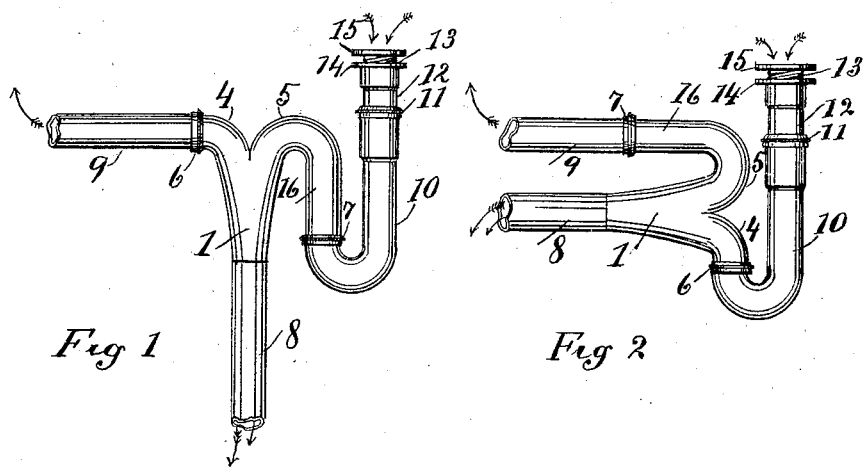
Figure 3:
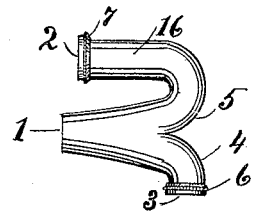

Figure 1 is a view of the trap fitting as it appears in the construction of an S-trap. Fig. 2 is a view of the trap fitting as it appears in the construction of a P-trap. Fig. 3 is a view of the interchangeable trap fitting detached.

The same reference characters represent the same parts in the different views.

The trap fitting consists of a main pipe or conduit 1 formed by the junction of two pipes, 4 and 5, at an acute angle, which pipes extended form two arms, one preferably longer than the other, the short arm making a quarter bend and the longer arm a full return bend. It will be observed that the junction of the two pipes at an acute angle forms a transverse tongue or partition across the center of the main pipe formed by said junction, and the diameter of the main pipe at the point where the two pipes meet is equal or about equal to the sum of the diameters of the two pipes. This main pipe can then be extended with a uniform diameter to a connection with an outlet pipe of the same size, or can be gradually contracted to connect with an outlet pipe of any suitable diameter.

In applying the trap-fitting to form an S-trap (Fig. 1), the long arm 16 is connected at 7 with the return bend on the bottom of the trap, and, together with the pipes 1, 8 and 10, forms the waste pipe or outlet. The short arm is connected at 6 with the vent pipe 9, forming the ventilating pipe of the S-trap. In applying the trap fitting to form a P-trap (Fig. 2), the short arm is connected at 6 with the return bend on the bottom of the trap, forming, with pipes 1, 8 and 10, the waste pipe or outlet. The long arm 16 is connected at 7 with the vent pipe 9, forming the ventilating pipe of the P-trap. It will be noted that the function of the short arm and long arm of the trap-fitting is reversed in applying the fitting to form a P-trap and an S-trap. The numerals 11 to 15 inclusive represent the inlet and bowl or sink connections.

In each style of trap, the P-trap and S-trap, Figs. 1 and 2, the tongue or partition formed by the junction at an acute angle of the pipes 4 and 5 prevents the liquid and solid matter in passing through the trap into the waste pipe or outlet from entering the vent pipe and depositing waste matter therein; but the liquid waste is diverted from the vent pipe directly into the outlet and a current created which forces the same on towards the outlet. The main pipe 1 being enlarged at the junction of the pipes 4 and 5 also tends to prevent any back-wash into the vent pipe.

Having thus fully described my invention, I claim and desire to secure by Letters Patent—

1. A trap fitting for basins, sinks, etc., consisting of a main pipe or conduit having two oppositely disposed and bent branches joining the main stem at an acute angle and extending in the same direction, one branch having a half bend and the other branch having a full return bend at the junction of the two branches with the main stem, the said branches being of such a length that when either is attached to the return bend at the bottom of a trap the crown of the waste pipe will be below the outlet of the sink or basin.

2. A trap fitting for basins, sinks, etc., consisting of a main pipe or conduit having two oppositely disposed and bent branches joining the main stem at an acute angle and extending in the same direction, one branch having a half bend and the other branch having a full return bend at the junction of the two branches with the main stem, there being a lateral enlargement at said junction, and the said branches being of such a length that when either is attached to the return bend at the bottom of a trap the crown of the waste pipe will be below the outlet of the sink or basin.

In testimony whereof I have signed my name to this specification in the presence of two subscribing witnesses.

RICHARD C. McCAFFREY.

Witnesses:
F. L. PRESCOTT,
LESLIE F. PRESCOTT.